United States Patent [19]

Kovacs et al.

[11] 4,121,266

[45] Oct. 17, 1978

[54] POLYAMIDE-IMIDE PRECONDENSATES

[75] Inventors: Jenoe Kovacs, Bobenheim-Roxheim; Hans Jung, Ludwigshafen; Matthias Marx, Bad Durkheim; Herbert Spoor, Limburgerhof, all of Fed. Rep. of Germany

[73] Assignee: BASF Aktiengesellschaft, Rheinland-Pfalz, Fed. Rep. of Germany

[21] Appl. No.: 693,351

[22] Filed: Jun. 7, 1976

[30] Foreign Application Priority Data

Jun. 25, 1975 [DE] Fed. Rep. of Germany ....... 2528251

[51] Int. Cl.$^2$ ...................... C08G 69/26; C08G 73/14
[52] U.S. Cl. ................................. 528/288; 174/110 N; 260/29.2 N; 260/30.2; 260/30.4 N; 260/30.8 DS; 260/32.6 NA; 260/857 UN; 428/435; 428/474
[58] Field of Search ........... 260/78 R, 78 TF, 47 CZ, 260/47 CP, 75 N, 65

[56] References Cited

U.S. PATENT DOCUMENTS

| | | | |
|---|---|---|---|
| 3,518,230 | 6/1970 | Sheffer et al. | 260/78 TF |
| 3,852,106 | 12/1974 | Incremona et al. | 260/78 TF |
| 3,975,345 | 8/1976 | Fessler | 260/78 R |
| 4,066,631 | 1/1977 | Dimmig | 260/78 R |

*Primary Examiner*—Harold D. Anderson
*Attorney, Agent, or Firm*—Keil, Thompson & Shurtleff

[57] ABSTRACT

A polyamide-imide precondensate which is solid at room temperature, but is fusible and soluble in polar solvents. It is manufactured by first condensing 1 mole of diamine with 2 moles of tricarboxylic acid anhydride in a diol as the solvent, to give a diimide-dicarboxylic acid, then esterifying the diimide-dicarboxylic acid with the diol and finally effecting the polycondensation by adding 1 mole of diamine per mole of diester. The precondensate may be used, as a melt, as a solution in organic solvents or as an aqueous dispersion, for coating electrical conductors.

2 Claims, No Drawings

POLYAMIDE-IMIDE PRECONDENSATES

The present invention relates to polyamide-imide precondensates, a process for their manufacture by condensing aromatic tricarboxylic acid anhydrides with di-primary aromatic amines in the presence of aliphatic diols, and the use of the precondensates for coating electrical conductors.

It is known that polyamide-imides are heat-resistant plastics which have found their principal application as wire enamels for coating electrical conductors. They are conventionally manufactured by reacting a diimide-dicarboxylic acid with a diisocyanate (German Published Application DAS 1,720,909), or a tricarboxylic acid anhydride and a diisocyanate (German Laid-Open Application DOS 1,595,797) or a tricarboxylic acid anhydride-chloride and an aromatic diamine (German Laid-Open Application DOS 1,520,968). These reactions are carried out in polar organic solvents; they give products of high molecular weight, so that relatively low concentrations must be employed. The products are, as a rule, infusible and cannot be milled. When the products are employed as wire enamels, relatively dilute organic solutions must be used; in general, these are solutions of from 20 to 25% strength in N-methylpyrrolidone.

However, in order to reduce costs and to protect the environment, it is desirable to use more highly concentrated solutions, or aqueous dispersions.

German Laid-Open Application DOS 2,016,778 (British Pat. No. 1,310,911) describes soluble, fusible polyamide-imide prepolymers. These are manufactured by reacting trimellitic anhydride with the diacetyl derivative of a diamine, acetic acid being eliminated. The reproducibility of this process is poor; if the resulting products are applied in the form of concentrated solutions or aqueous dispersions to electrical conductors, the coatings obtained are unsatisfactory.

It is an object of the present invention to provide polyamide-imide precondensates having a defined composition and defined end groups. It is a further object of the present invention to provide a simple process, which is easy to carry out, for the manufacture of such polyamide-imide precondensates. The latter should be fusible, readily soluble in polar solvents, and millable, so that they can be used, in the form of concentrated solutions or aqueous dispersions, for coating electrical conductors.

We have found that this object is achieved with a polyamide-imide precondensate which is solid at room temperature but is fusible and soluble in polar solvents, and which essentially has the following structural formula:

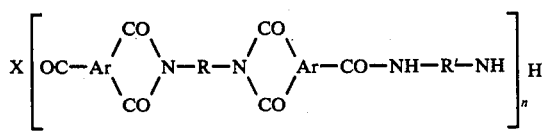

where X, Ar, R, R' and $n$ have the following meanings: X is a monovalent alcoholate radical of an aliphatic diol, Ar is a trivalent aromatic hydrocarbon radical, R and R' are divalent aromatic hydrocarbon radicals and may be identical or different and $n$ is an integer with a mean value of from 1 to 10 and preferably from 2 to 5.

According to the invention, this polyamide-imide precondensate is manufactured by reacting an aromatic tricarboxylic acid anhydride with a di-primary aromatic amine in the presence of an aliphatic diol, in which reaction first 1 mole of diamine is condensed with 2 moles of tricarboxylic acid anhydride in the diol as the solvent, at below 150° C., to give a diimide-dicarboxylic acid, the latter is then esterified with the diol at above 150° C. in the presence of an esterification catalyst, excess diol is then substantially distilled off, where necessary, and finally about 1 mole of diamine is added per mole of the diester and the diol liberated is distilled off.

The preferred aromatic tricarboxylic acid anhydride is trimellitic anhydride. Benzophenone-3,4,4'-tricarboxylic acid anhydride or naphthalenetricarboxylic acid anhydrides may also be used.

Examples of suitable di-primary aromatic amines are m- and p-phenylenediamine, benzidine, diaminodiphenylpropane, diaminodiphenylamine, diaminidiphenyl ether, diaminodiphenyl sulfide and diaminodiphenyl sulfone; diaminodiphenylmethane is preferred.

Preferred aliphatic diols are those of the general formula HO-R-OH, where R is an aliphatic hydrocarbon radical or oxy-hydrocarbon radical of 2 to 6 carbon atoms, e.g. ethylene glycol, 1,3-propanediol, 1,4-butanediol, diethylene glycol and triethylene glycol. Ethylene glycol is particularly suitable.

To carry out the reaction, 1 mole of diamine and 2 moles of tricarboxylic acid anhydride are first mixed, in the diol as the solvent. Slight deviations, e.g. of up to ± 10%, from the stated molar ratio have no adverse effect on the course of the reaction. If appropriate, up to 30% by weight, based on the sum of diamine and tricarboxylic acid anhydride, of inert solvents may be added to the reaction mixture. These may be aromatic solvents, e.g. toluene or xylene, or polar solvents, e.g. tetrahydrofuran or N-methylpyrrolidone. At least 2 moles of the diol should be used per mole of diamine: preferably, from 4 to 20 moles of diol per mole of diamine are used. In general, the reaction is initially carried out at room temperature. This first results in a solution of an addition product; on heating at above about 80° C., water is eliminated and the diimide-dicarboxylic acid precipitates. A pasty suspension is obtained.

The esterification of the diimide-dicarboxylic acid with the diol only starts from about 150° C.; it is accelerated by esterification catalysts. These may be added either from the start or only at this stage. The preferred catalysts are metal oxides or metal salts of organic acids, e.g. acetates of divalent metals. Manganese acetate, zinc acetate and magnesium acetate are particularly preferred. They may be present in amounts of from 0.01 to 5% by weight, preferably from 0.1 to 1% by weight, based on the diester. The diester is soluble in the diol, so that a viscous solution forms. The esterification is advantageously carried out at below the boiling point of the diol, unless superatmospheric pressure is employed.

Next, excess diol is preferably distilled off. In general, this is done by heating to above the boiling point of the diol, but the diol can also be distilled by placing the mixture under reduced pressure. The temperature used is preferably from 200 to 300° C. A highly concentrated solution of the diester in the diol is obtained; its solids content is in general from 40 to 90% by weight and preferably from 40 to 60% by weight.

Finally, about 1 mole of diamine is added per mole of the diester. The diamine may be the same as, or different from, the diamine used in the initial reaction. The diamine displaces the diol and an amide is formed, which can condense further. Since this stage is also preferably carried out at from 200° to 300° C., the diol liberated distils off, though not completely, since the ends of the polyamide-imide precondensate formed terminate in diol radicals.

In this stage somewhat greater variation in the molar ratio of diester to diamine is possible; from 0.5 to 1.5 moles of diamine may be employed per mole of diester. This variation has some effect on the degree of condensation, but above all on the nature of the end groups. If a very large excess of diamine is employed, precondensates in which both ends terminate in diamide groups are also produced.

Apart from this variant, the precondensate however essentially has the structural formula given above. When using the preferred reactants, the formula of the product is:

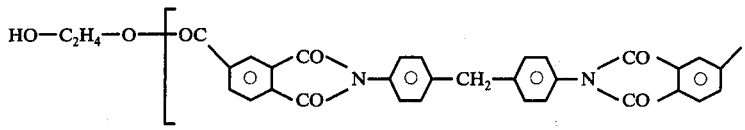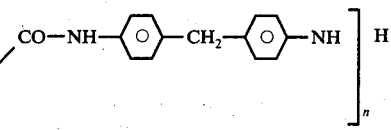

where $n$ is from 2 to 5.

The polyamide-imide precondensates are very readily soluble in polar organic solvents, e.g. N-methylpyrrolidone, tetrahydrofuran, dioxane, dimethylformamide and dimethylsulfoxide; in general, they have viscosities (measured in 33% strength solution in N-methylpyrrolidone at 25° C.) of from 40 to 600, preferably from 60 to 300, centistokes. They are solid at room temperature but are brittle and can very easily be milled to give fine powders. They are fusible at from 120° to 180° C., without undergoing decomposition; further condensation, with chain extension, only starts at above about 220° C.

The precondensates are used in the form of a melt, a solution in organic solvents or, preferably, an aqueous dispersion. They may be employed, inter alia, for the manufacture of heat-resistant films, adhesives, laminates or glass fiber-reinforced prepregs. Their preferred use is as a wire enamel for insulating electrical conductors. For this purpose, either solutions, of from 35 to 80% strength, in polar organic solvents, or dispersions, of from 20 to 60% strength, in water, are used. The aqueous dispersions in general contain conventional additives, such as stabilizers, e.g. polyvinylpyrrolidone, copolymers of vinyl propionate and vinylpyrrolidone, polyacrylic acid, copolymers of acrylic esters and acrylonitrile, or polyvinyl alcohols, in amounts of from 1 to 5% by weight, catalysts, e.g. oxotitanium compounds, titanates, amines, sulfonic acids, metal acetates, metal oxides, alkyl phosphates or aryl phosphates, and flow control agents, e.g. butanediol, diethylene glycol, glycol monoethers, dimethylformamide or N-methylpyrrolidone, in amounts of from 1 to 10% by weight.

Where the last stage of the manufacture of the precondensate is carried out with an excess or deficiency of amine, it is advantageous to add chain extenders to the wire enamel solution or dispersion before baking. In the case of an initial deficiency of amine, a further amount of amine is used; in the case of an excess (preferably of from 1.05 to 1.4 moles) of amine, trimellitic anhydride, pyromellitic anhydride, dicyclooctenetetracarboxylic acid dianhydride or benzophenonetetracarboxylic acid dianhydride are added. Where the product is to be applied from aqueous dispersion, it is advantageous not to employ the anhydrides, but to employ the corresponding methyl esters or ethyl esters or, preferably, diglycol ester, instead. The addition of tetracarboxylic acid derivatives increases the proportion of imide in the wire enamel and thereby improves the thermal properties. The baking of is carried out in the conventional manner at from 300° to 600° C., whereupon further condensation and crosslinking occur.

EXAMPLE 1

460.8 parts (2.4 moles) of trimellitic anhydride are suspended in 650 parts (10.5 moles) of glycol. 237.6 parts (1.2 moles) of 4,4'-diaminodiphenylmethane are then added under nitrogen. A vigorous reaction ensues, with the temperature rising to 50° C., and a homogeneous solution forms. On further heating the solution at from 70° to 80° C., the diimide-dicarboxylic acid precipitates and a viscous dispersion is obtained. The reaction mixture is then heated at from 140° to 160° C. whilst distilling off the equimolar amount of water. The temperature is then raised to from 190° to 200° C., and 0.4 part of manganese-(II) acetate is added. After a reaction time of from 5 to 10 hours at this temperature, a homogeneous solution forms. The temperature is then raised to from 200° to 205° C., in the course of which 464 parts of glycol distil off. The clear melt is now cooled to 160° C. and 237.6 parts (1.2 moles) of 4,4'-diaminodiphenylmethane are added. The temperature is then raised by from about 5 to 10° C. per hour, to from 220 to 230° C., during which time a further 100 parts of glycol distil off and the viscosity rises constantly. As soon as the viscosity has reached 72 centistokes (measured on a 33% strength solution in N-methylpyrrolidone at 30° C.), the reaction is discontinued and the clear dark brown melt is discharged from the reaction vessel.

(a) A 40% strength solution of the melt in N-methylpyrrolidone, having a viscosity of 800 centipoise, was prepared. 3%, based on solids, of triethanolamine titanate were added, as a catalyst, to the solution. Copper wires of 0.8 mm diameter were then coated on a commercial wire-coating machine at 460° C. and a speed of from 5 to 7 m/minute. The coated wires had the following properties:

| | |
|---|---|
| Pencil hardness (DIN 46,453): | 4 – 5 H |
| Peel test (according to IEC 251-1): | 220 – 230 |
| Heat shock (DIN 46,453): | satisfactory at 300° C |
| Softening point (DIN 53,180): | 325° C. |

(b) The solidified melt was next comminuted mechanically to a particle size of less than 1 mm, after which it was milled to a size of less than 70μ on an impact-disc mill. The powder was dispersed in water containing 3% (based on the powder added) of a copolymer of vinyl propionate and vinylpyrrolidone, 0.5% of polyvinylpyrrolidone and 1% of triethanolamine. Dispersion was affected by means of a laboratory mill, at a throughput of 10 kg/hour and a speed of 300 rpm. The average particle size of the dispersion obtained was less than 1μ.

3% (based on the powder added) of triethanolamine titanate and 1% of ethanolamine were then added to the dispersion. The solids content of the dispersion was 43% and the viscosity 120 centipoise. Copper wires were coated with the dispersion on a wire-coating machine at 500° C. The coated wires had the following properties:

| | |
|---|---|
| Pencil hardness | 5 H |
| Peel test: | 180 – 200 |
| Heat shock: | satisfactory at 300° C |
| Softening point: | 345° C. |

(c) Glass mats were impregnated with the dispersions prepared according to (b) and cured at 250° C. after wiping off the excess. The impregnation was repeated until the resin content was 40%. 16 layers of such prepregs were then stacked and pressed at 320° C. under a pressure of 10 Newton/mm$^2$ to give laminates. The latter had a high flexural strength which remained essentially unchanged even up to 250° C.

EXAMPLE 2

Trimellitic anhydride and 4,4'-diaminodiphenylmethane were reacted as described in Example 1. The diimide-dicarboxylic acid was esterified as in Example 1 and 80% of the glycol were distilled off. 190.1 parts (80 mole%, based on diimide-dicarboxylic acid diglycol ester) were then added to the melt at 160° C. and glycol was distilled off until the viscosity reached 63 centistokes (measured on a 33% strength solution in N-methylpyrrolidone at 30° C.).

(a) 20 mole% of 4,4'-diaminodiphenylmethane were added to the above solution, so that equimolar amounts of acid groups and amino groups were present. Copper wires were coated with this solution.

(b) To prepare dispersions, the melt was mixed with 20 mole% of 4,4'-diaminodiphenylmethane and homogenized, shortly before discharging it from the reaction vessel. 32% strength aqueous dispersions were then prepared as described in Example 1; these were suitable for use as wire enamels.

EXAMPLE 3

Diimide-dicarboxylic acid diglycol esters were prepared as described in Example 1 and 80% of the excess glycol were distilled off. The melt was then cooled to 160° C. and 332.6 parts of 4,4'-diaminodiphenylmethane (140 mole%, based on diimide-dicarboxylic acid) were added. On distilling off the glycol at up to 235° C., a clear melt having a viscosity of 242 centistokes was obtained.

(a) 40 mole% of pyromellitic dianhydride were added to the solution and copper wires were coated with the mixture.

(b) A part of the melt was dispersed in water as described in Example 1. A dispersion having an average particle size of less than 1μ and a solids content of 30% was obtained. 40 mole% (to ensure the presence of equimolar amounts of amine and acid) of pyromellitic acid diglycol ester, and 3% (based on solids) of N-methylpyrrolidone were added to the dispersion. Copper wires were again coated with this dispersion.

We claim:

1. A process for the manufacture of polyamide-imide precondensate, which is solid at room temperature but is fusible and soluble in polar solvents, by reacting an aromatic tricarboxylic acid anhydride with a diprimary aromatic amine in the presence of an aliphatic diol, in which reaction first 1 mole of diamine is condensed with 2 moles of tricarboxylic acid anhydride in the diol as the solvent, at below 150° C., to give a diimide-dicarboxylic acid, the latter is then esterified 2. A process for the manufacture of a polyamide-imide precondensate as claimed in claim 1, where from 1.05 to 1.4 moles of diamine are added per mole of the diester.

* * * * *

UNITED STATES PATENT AND TRADEMARK OFFICE
CERTIFICATE OF CORRECTION

PATENT NO. : 4,121,266
DATED : October 17, 1978
INVENTOR(S) : KOVACS ET AL

It is certified that error appears in the above–identified patent and that said Letters Patent are hereby corrected as shown below:

In claim 1, last line, insert after "esterified" --with the diol at above 150°C in the presence of an esterification catalyst to form a diester, any excess diol is then substantially distilled off, and finally about 1 mole of diamine is added per mole of the diester and the diol liberated is distilled off.--

Signed and Sealed this

First Day of May 1979

[SEAL]

Attest:

RUTH C. MASON
Attesting Officer

DONALD W. BANNER
Commissioner of Patents and Trademarks